United States Patent
Lin (10) Patent No.: US 11,480,275 B2
(45) Date of Patent: Oct. 25, 2022

(54) HOSE ADAPTER

(71) Applicant: Yung-Hsiang Lin, Changhua (TW)

(72) Inventor: Yung-Hsiang Lin, Changhua (TW)

( * ) Notice: Subject to any disclaimer, the term of this patent is extended or adjusted under 35 U.S.C. 154(b) by 226 days.

(21) Appl. No.: 17/061,547

(22) Filed: Oct. 1, 2020

(65) Prior Publication Data

US 2021/0199218 A1    Jul. 1, 2021

(30) Foreign Application Priority Data

Dec. 25, 2019   (TW) ................................ 108147634

(51) Int. Cl.
*F16L 27/08* (2006.01)
*F16L 33/22* (2006.01)
*B05B 15/652* (2018.01)

(52) U.S. Cl.
CPC ........ *F16L 27/0804* (2013.01); *B05B 15/652* (2018.02); *F16L 33/225* (2013.01)

(58) Field of Classification Search
CPC ... F16L 27/0804; F16L 33/225; F16L 33/223; F16L 33/28; B05B 15/652
See application file for complete search history.

(56) References Cited

U.S. PATENT DOCUMENTS

| | | | | |
|---|---|---|---|---|
| 1,195,433 A | * | 8/1916 | De Witt | F16L 33/223 285/259 |
| 4,324,423 A | * | 4/1982 | Pitesky | F16L 27/0804 285/212 |
| 9,458,959 B2 | * | 10/2016 | Mammen | F16L 33/225 |
| 2002/0129861 A1 | * | 9/2002 | Holdenried | F16L 27/0804 138/120 |
| 2007/0011805 A1 | * | 1/2007 | Shein | B05B 15/652 4/615 |
| 2007/0284461 A1 | * | 12/2007 | Alexander | F16L 33/223 138/109 |
| 2011/0309167 A1 | * | 12/2011 | Grether et al. | B05B 15/652 239/587.4 |
| 2014/0312610 A1 | * | 10/2014 | Chiang | F16L 33/223 285/89 |

(Continued)

FOREIGN PATENT DOCUMENTS

| | | | | |
|---|---|---|---|---|
| DE | 9218525 U1 | * | 5/1992 | .......... F16L 27/0804 |
| DE | 19654435 A1 | * | 7/1998 | ............ F16L 33/223 |

(Continued)

*Primary Examiner* — Matthew Troutman
*Assistant Examiner* — Fannie C Kee
(74) *Attorney, Agent, or Firm* — Che-Yang Chen; Law Office of Michael Chen (57) ABSTRACT

A hose adapter may include an outer tube, an inner tube, a hose connector, and a hose. An inner peripheral ring protrudes from the inner periphery of the outer tube while an expanding ring portion protrudes from the outer periphery of an end of the inner tube. The outer periphery of the inner tube further has a first peripheral recess, a second peripheral recess, and a first outer thread, and a first O-ring and a second O-ring are respectively disposed on the first peripheral recess and the second peripheral recess. The inner tube is inserted into the outer tube, and the expanding ring portion is abutted against the inner peripheral ring, and the first O-ring is coupled between the outer tube and the inner tube while the second O-ring and the first outer thread are adapted to pass through and be exposed out of the outer tube.

6 Claims, 13 Drawing Sheets

(56) References Cited

U.S. PATENT DOCUMENTS

2020/0347975 A1* 11/2020 Chen .................... F16L 33/223

FOREIGN PATENT DOCUMENTS

| DE | 202020104842 U1 | * | 12/2020 | ............ F16L 33/225 |
| EP | 3742034 A1 | * | 11/2020 | .............. F16L 33/28 |
| FR | 534155 A | * | 1/1922 | .............. F16L 33/28 |
| KR | 20090012970 U | * | 12/2009 | .......... F16L 27/0804 |

* cited by examiner

PRIOR ART

FIG. 13

PRIOR ART

HOSE ADAPTER

FIELD OF THE INVENTION

The present invention relates to a hose adapter and more particularly to a hose adaptor that is rotatable relative to the connecting portion of water source.

BACKGROUND OF THE INVENTION

Figure 12:
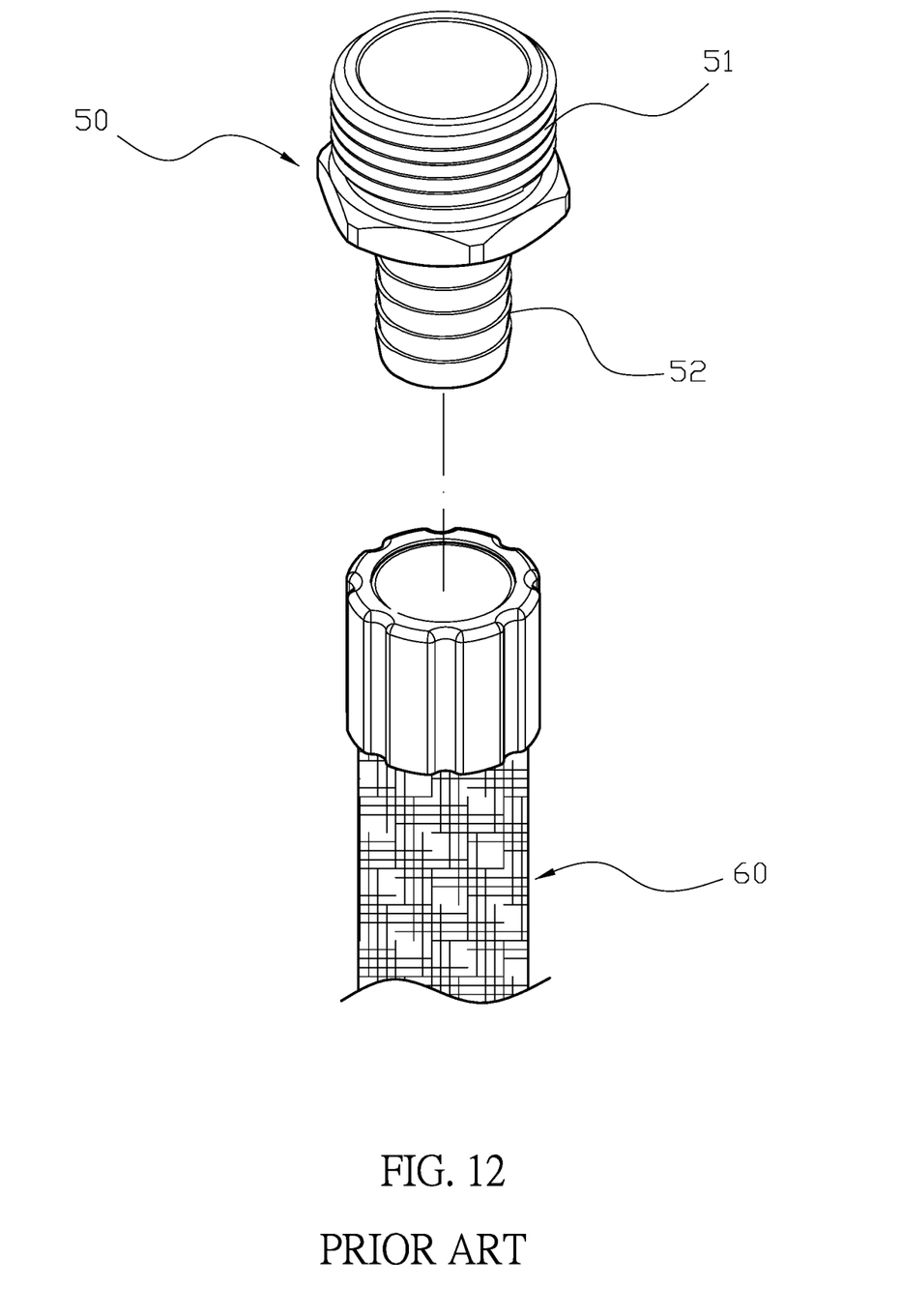
FIG. 12 is a prior art.
Figure 13:
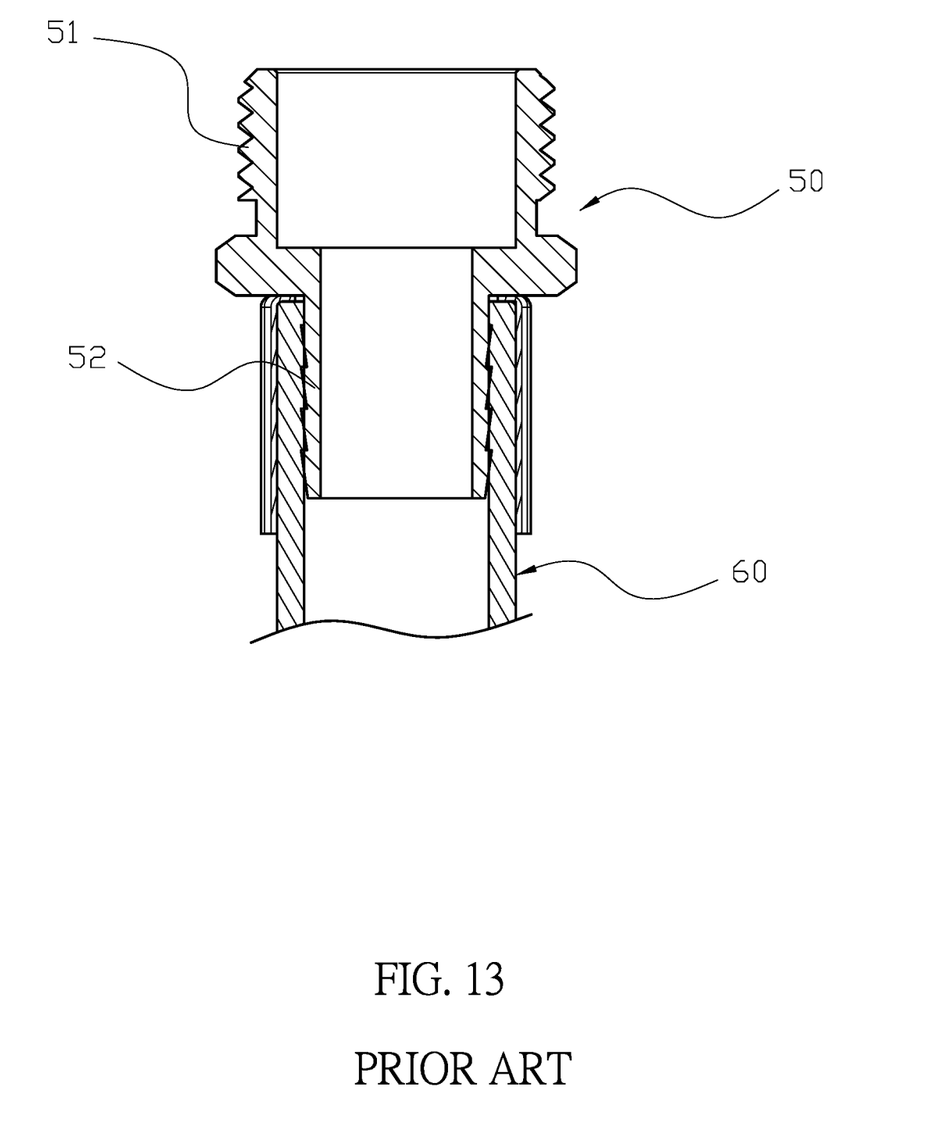
FIG. 13 is a prior art.

Referring to FIGS. 12 and 13, a conventional hose adapter comprises main body (50) and a hose (60), and a thread section (51) formed at an end of the main body (50) is adapted to connect to water source such as a water spray gun, a faucet, and a sprinkler, and the other end of the main body (50) has an abutting section (52) which is configured to connect to the hose (60).

However, the conventional hose adapter has following disadvantages: when the hose (60) is locked on the water source, the hose (60) is driven and synchronously rotated, which causes not only trouble in use and assembly but loosening and damages of the main body (50). Therefore, there remains a need for a new and improved design for a hose adapter to overcome the problems presented above.

SUMMARY OF THE INVENTION

The present invention provides a hose adapter comprising an outer tube, an inner tube, a hose connector, and a hose. The outer tube has a first through hole axially penetrating through the outer tube, and an inner peripheral ring protrudes from the inner periphery of the first through hole. The outer tube has a driving portion at an end thereof while a first thread section is formed on the other end of the outer tube. The inner tube has a second through hole axially penetrating through the inner tube, and an open end of the second through hole is formed into a lock hole having a polygonal cross section. An expanding ring portion protrudes from the outer periphery of the end of the inner tube having the lock hole, and the outer periphery of the inner tube from the expanding ring portion to the other end of the inner tube sequentially has a first peripheral recess, a second peripheral recess, and a first outer thread. A first O-ring and a second O-ring are respectively disposed on the first peripheral recess and the second peripheral recess. The inner tube is inserted into the first through hole of the outer tube, and the expanding ring portion is abutted against the inner peripheral ring, and the first O-ring is coupled between the outer tube and the inner tube while the second O-ring and the first outer thread are adapted to pass through and be exposed out of the outer tube. The hose connector having a tube body comprises a nut at an end thereof, and an inner thread and a non-thread section are formed on the inner periphery of the nut respectively positioned away from and adjacent to the open end of the nut. The inner thread of the hose connector is engaged with the first outer thread of the inner tube, and the second O-ring is configured to be abutted between the non-thread section and the second peripheral recess, and the other end of the hose connector has an abutting section. The hose is connected to the abutting section of the hose connector at an end thereof, and the outer periphery of the end of the hose has a metal sleeve to secure the connection between the hose connector and the hose.

In one embodiment, the first thread section is formed on the outer periphery of the outer tube, and the first thread section is adapted to be engaged into the connecting portion of a water spray gun or a sprinkler.

In another embodiment, the first thread section is formed on the inner periphery of the outer tube, and the first thread section is configured to be engaged with the outer periphery of the spout of a faucet.

In still another embodiment, the non-thread section has an inclined guiding periphery formed on an inner edge of the open end of the nut to enable the non-thread section to slide through the second O-ring.

In a further embodiment, the lock hole is formed with pentagonal, octagram, or plum-blossom cross section.

In still a further embodiment, a plurality of tapered threads are formed on the abutting section, and the hose is adapted to be abutted between the tapered threads and the metal sleeve.

Comparing with conventional hose adapter, the present invention is advantageous because: (i) the two ends of the inner peripheral ring are respectively blocked by the expanding ring portion of the inner tube and the nut of the hose connector, so that the inner tube, the hose connector, and the hose are not driven and rotated synchronously with the outer tube when water spraying or the hose connecting to the water source, thereby preventing the winding of the hose; and (ii) the outer tube only makes small-area contact with the inner tube through the inner peripheral ring such that the connection between the outer tube and inner tube is slidable, which is labor-saving in operation of the hose and prevents the connection between the outer tube and the inner tube from getting stuck that cannot have relative rotation.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
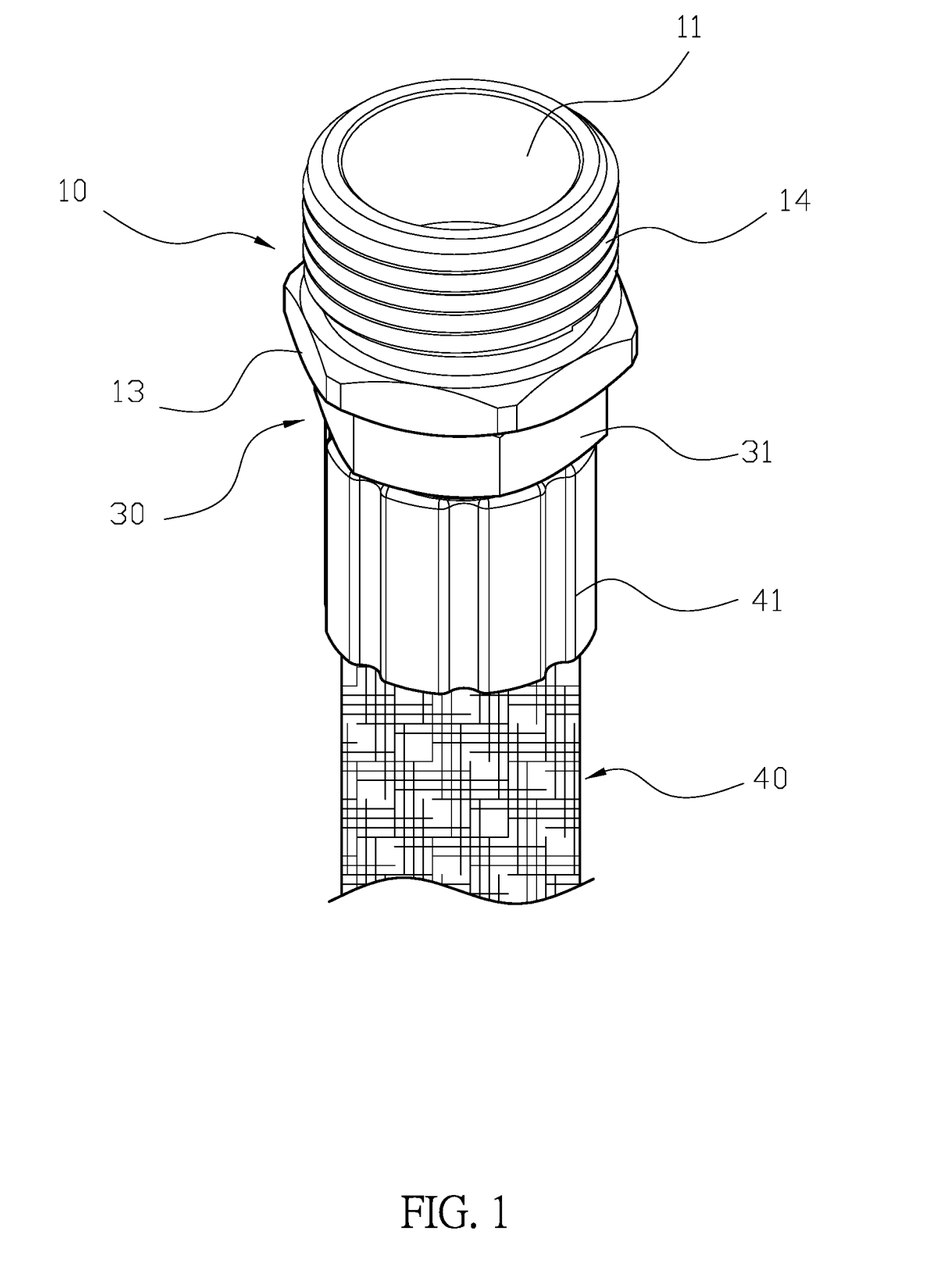
FIG. 1 is a three-dimensional assembly view of a hose adapter of the present invention.
Figure 2:
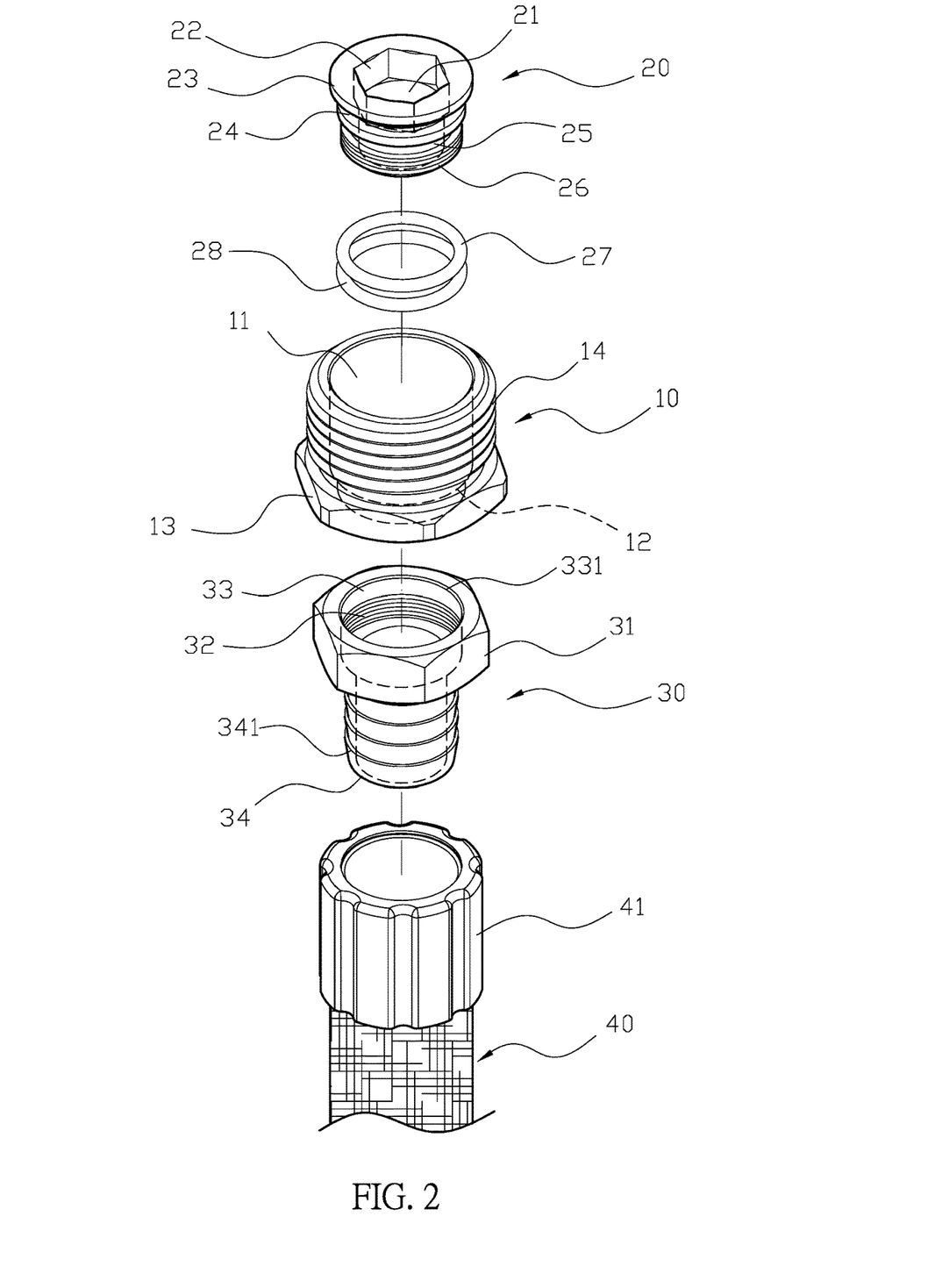
FIG. 2 is a three-dimensional exploded view of the hose adapter of the present invention.
Figure 3:
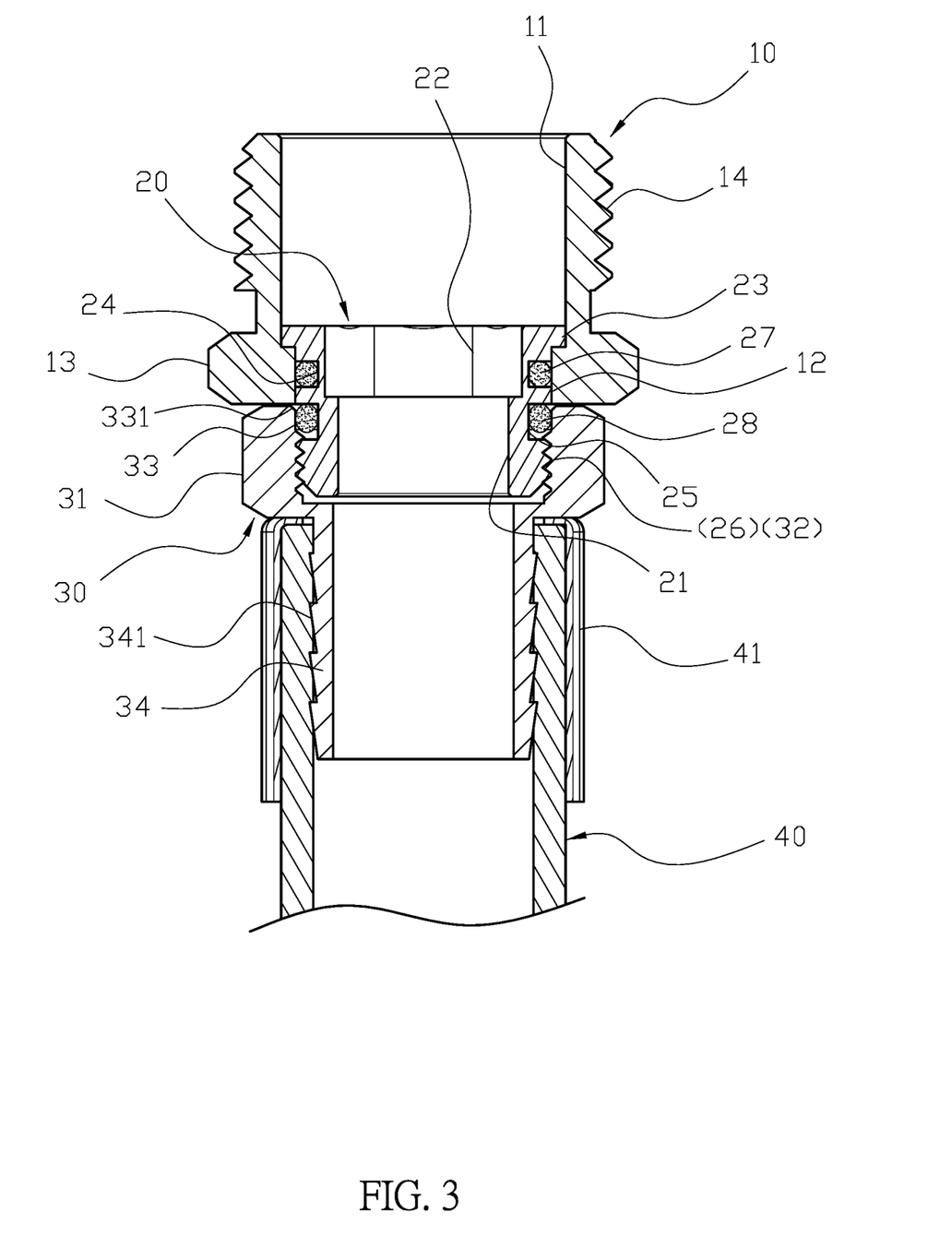
FIG. 3 is a sectional view of the hose adapter of the present invention.
Figure 9:
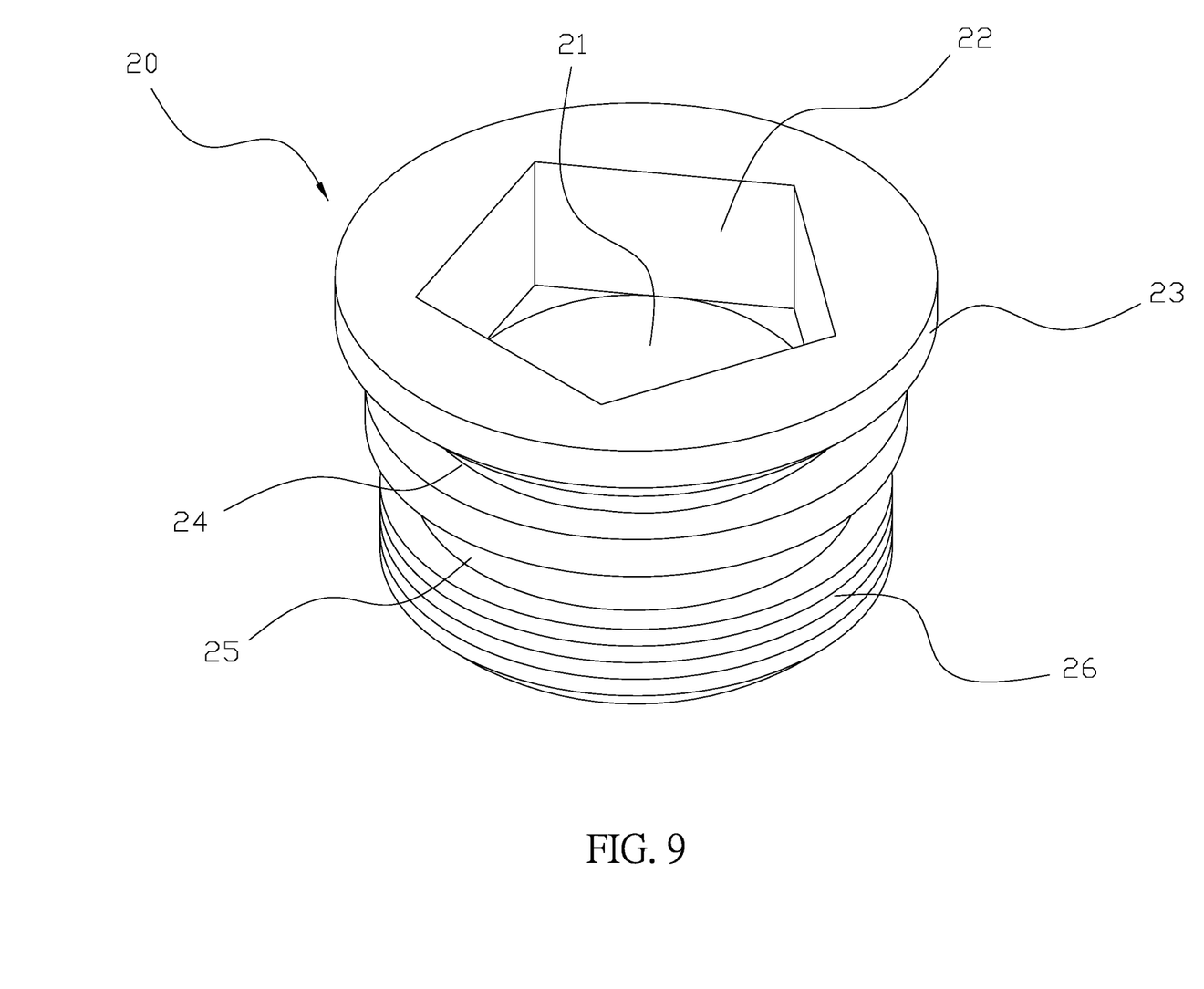
FIG. 9 is a three-dimensional view of a first embodiment of an inner tube of the hose adapter in the present invention.
Figure 10:
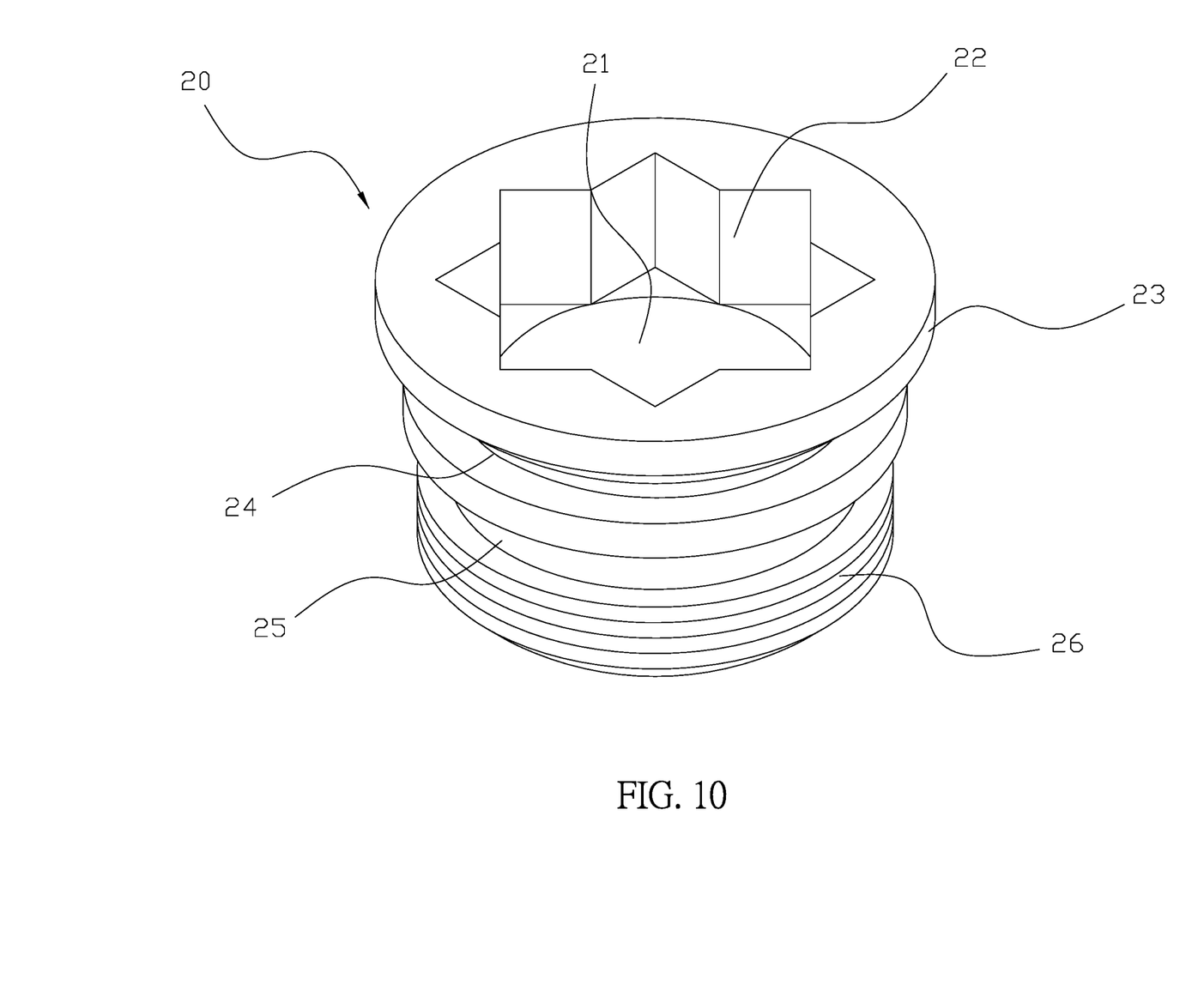
FIG. 10 is a three-dimensional view of a second embodiment of the inner tube of the hose adapter in the present invention.
Figure 11:
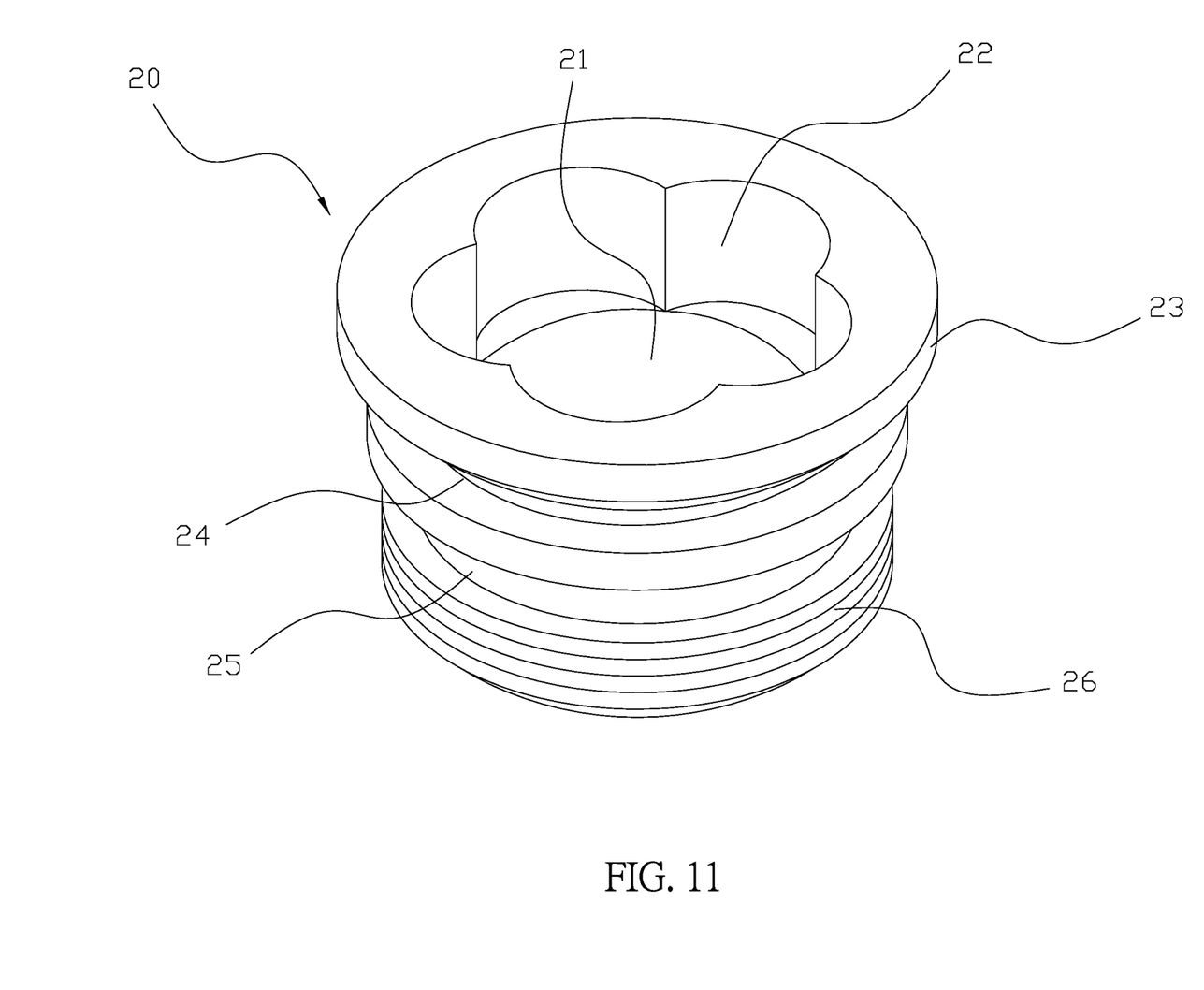
FIG. 11 is a three-dimensional view of a third embodiment of the inner tube of the hose adapter in the present invention.

In order to further understand the goal, characteristics and effect of the present invention, a number of embodiments along with the drawings are illustrated as following:

Referring to FIGS. 1 to 3, the present invention provides a hose adapter comprising an outer tube (10), an inner tube (20), a hose connector (30), and a hose (40). The outer tube (10) has a first through hole (11) axially penetrating through the outer tube (10), and an inner peripheral ring (12) protrudes from the inner periphery of the first through hole (11). The outer tube (10) has a driving portion (13) at an end thereof while a first thread section (14) is formed on the other end of the outer tube (10). The inner tube (20) has a second through hole (21) axially penetrating through the inner tube (20), and an open end of the second through hole (21) is formed into a lock hole (22) having a polygonal cross section. The lock hole (22) may be formed with pentagonal, octagram, or plum-blossom cross section (as shown in FIGS. 9, 10 and 11). Moreover, an expanding ring portion (23) protrudes from the outer periphery of the end of the inner tube (20) having the lock hole (22), and the outer periphery of the inner tube (20) from the expanding ring portion (23) to the other end of the inner tube (20) sequentially has a first peripheral recess (24), a second peripheral recess (25), and a first outer thread (26). Furthermore, a first O-ring (27) and a second O-ring (28) are respectively disposed on the first peripheral recess (24) and the second peripheral recess (25). The inner tube (20) is inserted into the first through hole (11) of the outer tube (10), and the expanding ring portion (23) is abutted against the inner peripheral ring (12), and the first O-ring (27) is coupled between the outer tube (10) and the inner tube (20) while the second O-ring (28) and the first outer thread (26) are adapted to pass through and be exposed out of the outer tube (10). The hose connector (30) having a tube body comprises a nut (31) at an end thereof, and an inner thread (32) and a non-thread section (33) are formed on the inner periphery of the nut (31) respectively positioned away from and adjacent to the open end of the nut (31). The inner thread (32) of the hose connector (30) is engaged with the first outer thread (26) of the inner tube (20), and the non-thread section (33) has an inclined guiding periphery (331) formed on an inner edge of the open end of the nut (31) to enable the non-thread section (33) to slide through the second O-ring (28) such that the second O-ring (28) is configured to be abutted between the non-thread section (33) and the second peripheral recess (25), thereby improving the structural stability of the second O-ring (28). Also, the other end of the hose connector (30) has an abutting section (34), and a plurality of tapered threads (341) are formed on the abutting section (34). The hose (40) is connected to the abutting section (34) of the hose connector (30) at an end thereof, and the outer periphery of the end of the hose (40) has a metal sleeve (41) to secure the connection between the hose connector (30) and the hose (40), the hose (40) is adapted to be abutted between the tapered threads (341) and the metal sleeve (41), so that the hose (40), the hose connector (30), and the inner tube (20) are configured to be synchronously rotatable relative to the outer tube (10).

Figure 4:
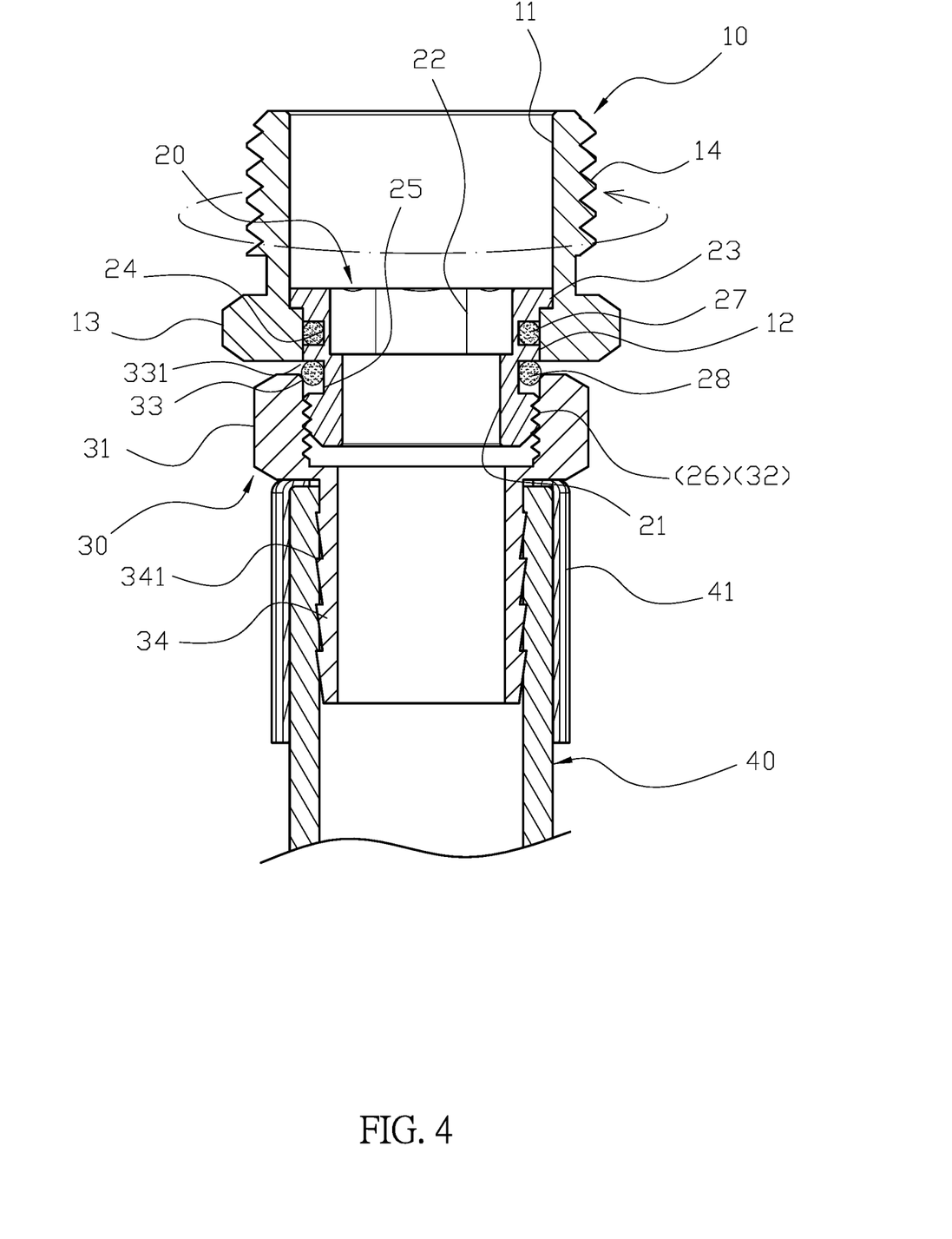
FIG. 4 is a schematic assembly view of the hose adapter of the present invention.

Structurally, referring to FIGS. 2 to 4, the first O-ring (27) and the second O-ring (28) are respectively disposed on the first peripheral recess (24) and the second peripheral recess (25) of the inner tube (20), and the inner tube (20) is connected and inserted into the first through hole (11) of the outer tube (10), and the first outer thread (26) of the inner tube (20) is adapted to pass through the inner peripheral ring (12), and the first outer thread (26) and the second O-ring (28) are exposed out of the outer tube (10). Also, the expanding ring portion (23) is abutted against the inner peripheral ring (12), and the first O-ring (27) is abutted between the inner peripheral ring (12) and the inner tube (20) so as to achieve the sealing effect. The end of the hose (40) having the metal sleeve (41) is disposed on the abutting section (34) of the hose connector (30), and the metal sleeve (41) is configured to squeeze the hose (40) to prevent the hose (40) from detached from the tapered threads (341) of the abutting section (34). Then, the nut (31) of the hose connector (30) is engaged with the first outer thread (26) of the inner tube (20). During the locking process, the inner tube (20) is not rotated by engaging the hand tool into the lock hole (22), and the nut (31) is easily screwed on the first outer thread (26) of the inner tube (20). The inclined guiding periphery (331) is adapted to enable the non-thread section (33) to easily slide through the second O-ring (28), and when the locking process, the non-thread section (33) is configured to make contact with the second O-ring (28) so as to prevent the nut (31) from restraining the position of the second O-ring (28), or the inner thread (32) is adapted to make contact with the second O-ring (28) so as to prevent the second O-ring (28) from deformed or damaged during the locking process, thereby improving the assembly yield that the second O-ring (28) is coupled between the inner tube (20) and the non-thread section (33) to achieve the sealing effect.

Figure 5:
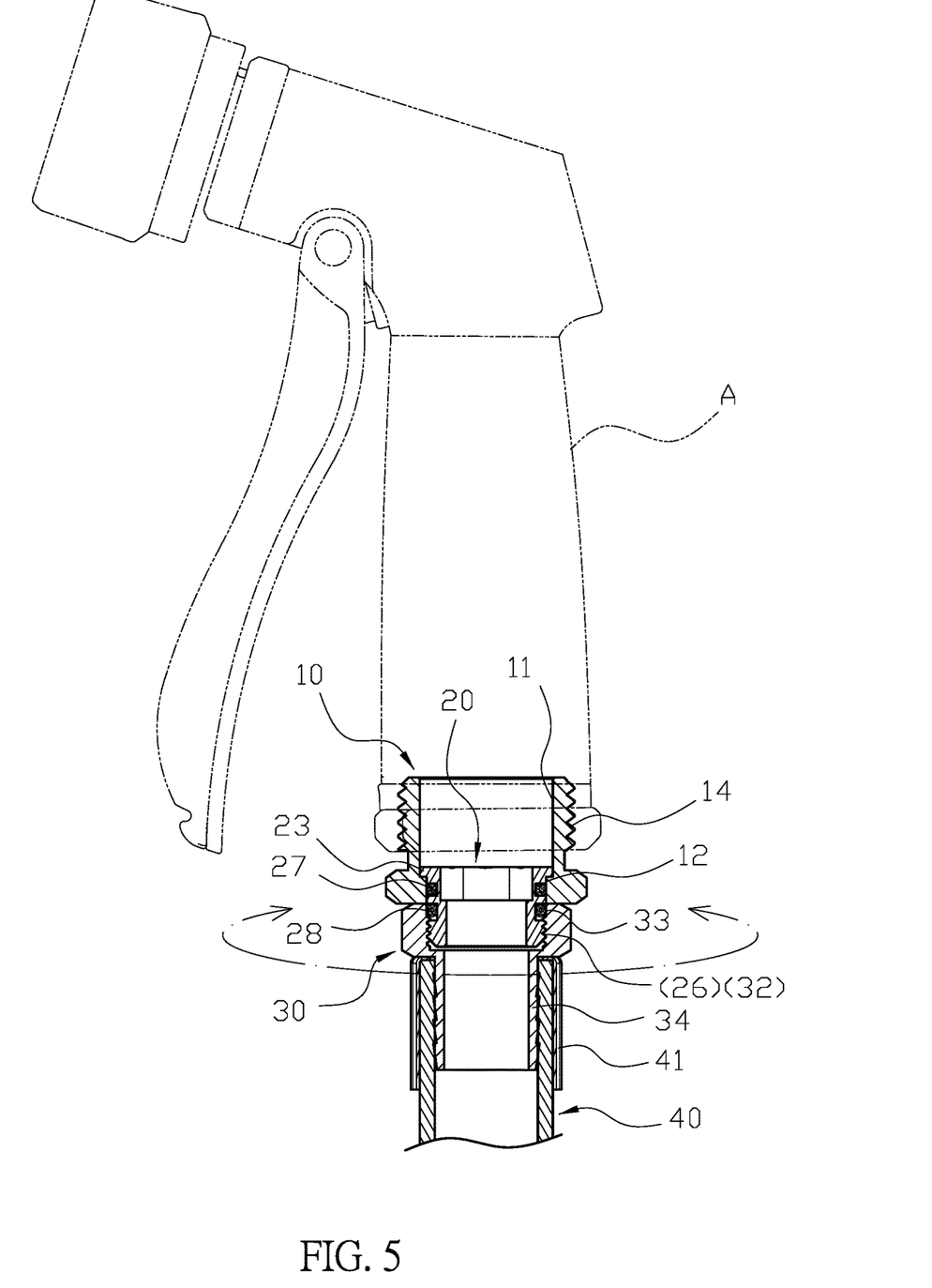
FIG. 5 is a schematic view illustrating the hose adapter of the present invention is connected to a water spray gun.
Figure 6:
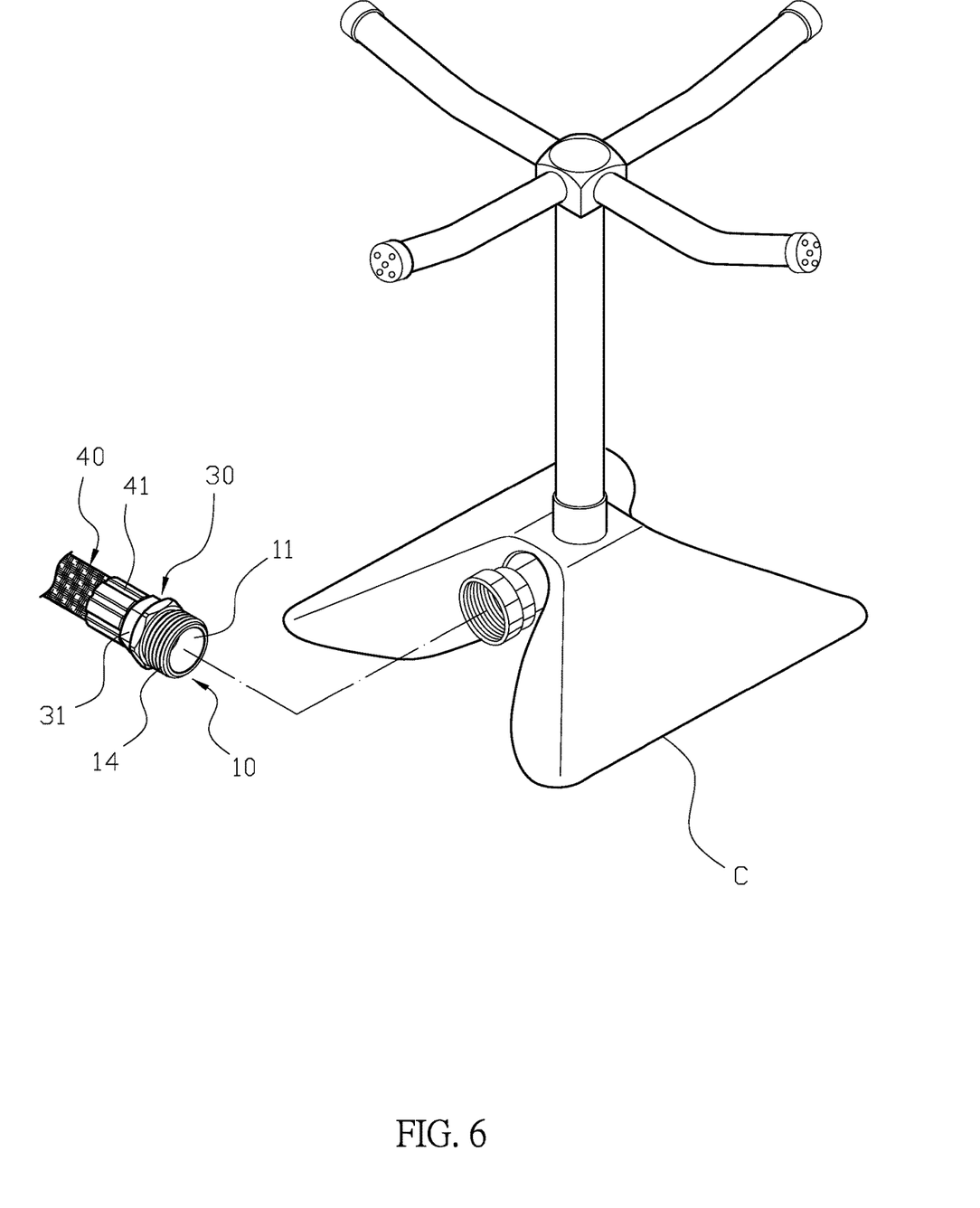
FIG. 6 is a schematic view illustrating the hose adapter of the present invention is connected to a sprinkler.
Figure 7:
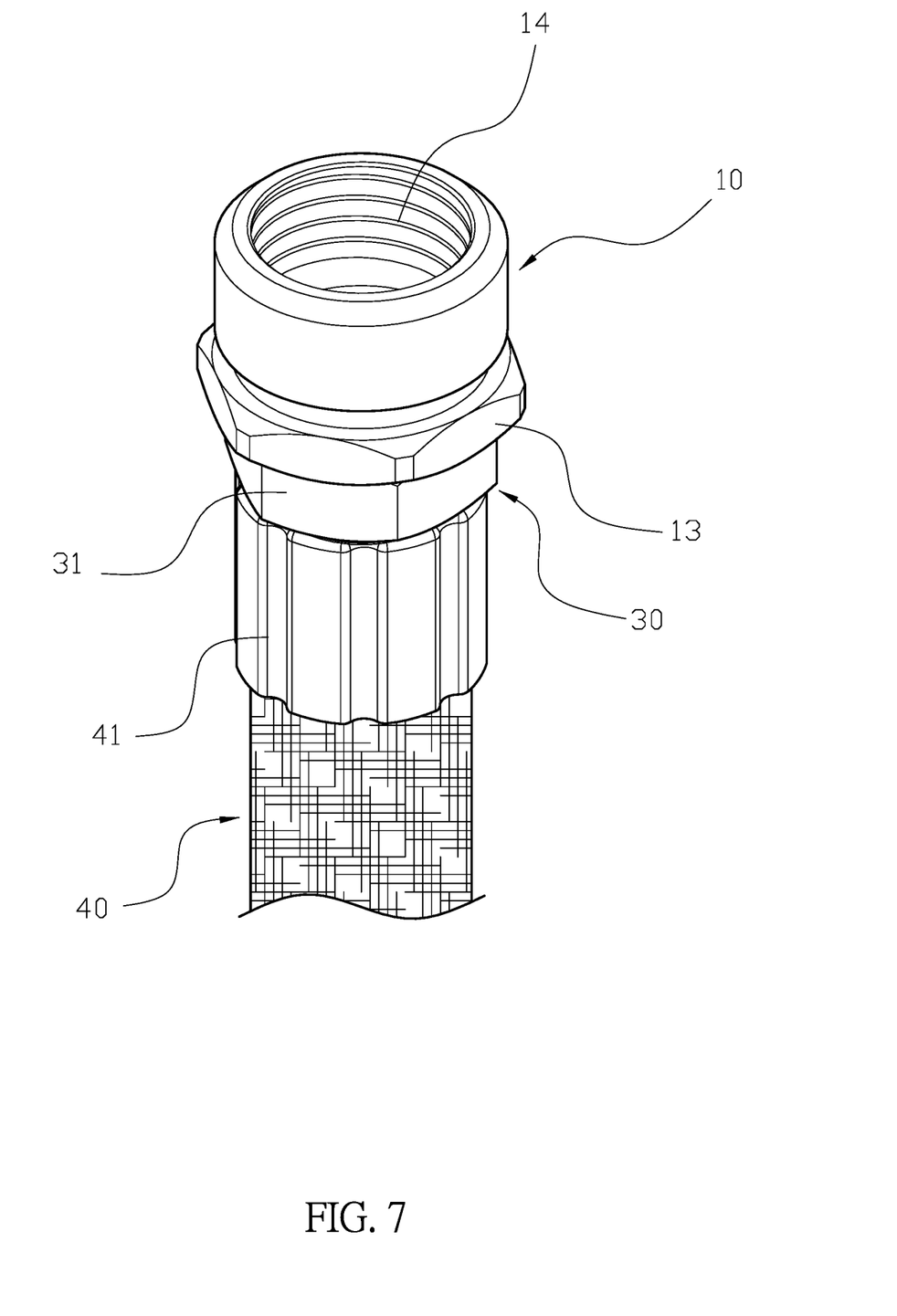
FIG. 7 is a three-dimensional assembly view of a second embodiment of the hose adapter of the present invention.
Figure 8:
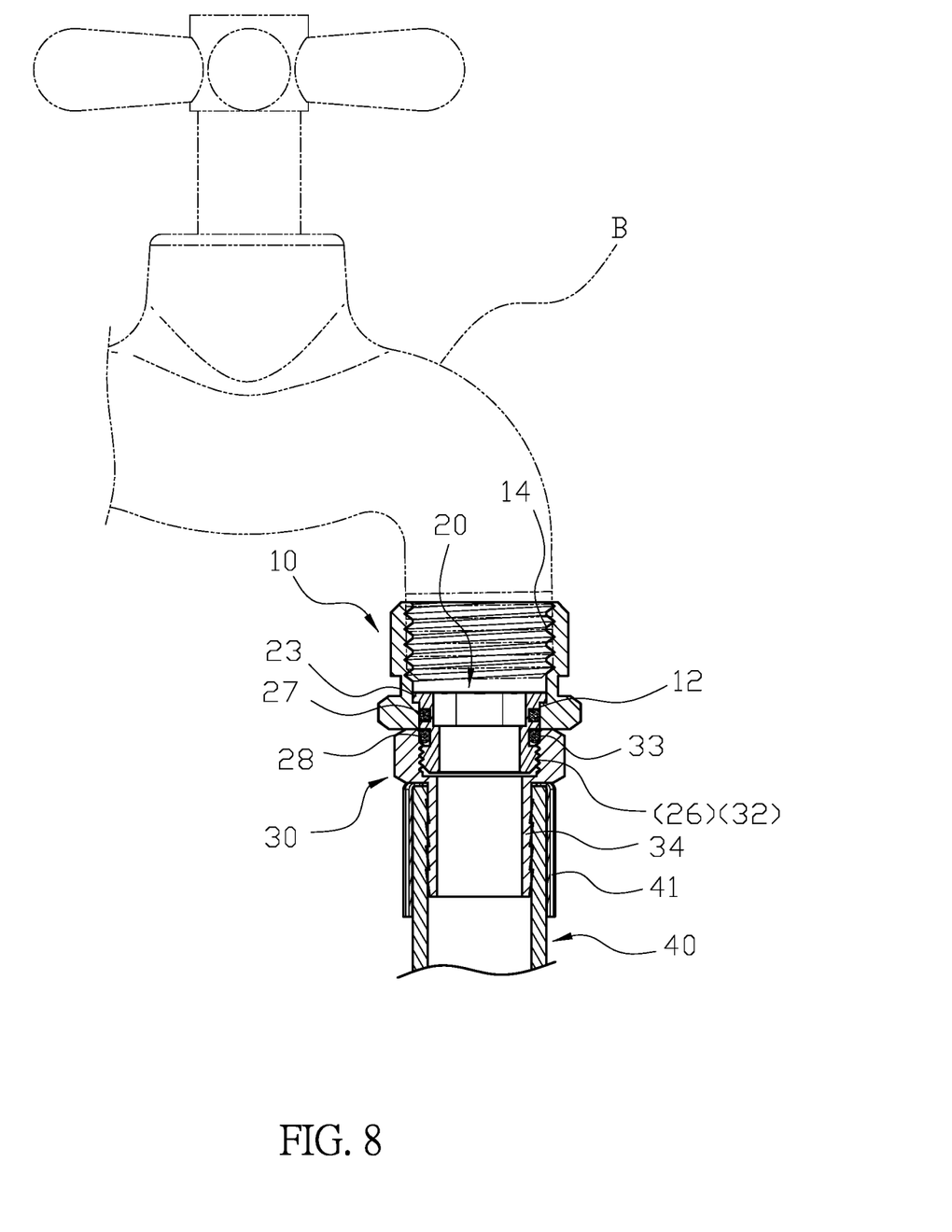
FIG. 8 is a schematic view illustrating the hose adapter of the present invention is connected to a faucet.

In actual application, referring to FIGS. 5 and 6, when the outer tube (10) is connected to the water source which is a water spray gun (A) or a sprinkler (C) through the first thread section (14), the first thread section (14) is formed on the outer periphery of the outer tube (10), and the first thread section (14) is adapted to be engaged into the connecting portion of the water spray gun (A) or the sprinkler (C). When the locking process, the outer tube (10) is rotated relative to the water spray gun (A) or the sprinkler (C), and since the two ends of the inner peripheral ring (12) are respectively blocked by the expanding ring portion (23) of the inner tube (20) and the nut (31) of the hose connector (30), the inner tube (20), the hose connector (30), and the hose (40) are not driven and rotated synchronously with the outer tube (10), thereby preventing the winding of the hose (40). Referring to FIGS. 7 and 8, when the water supply or water source is a faucet (B), the first thread section (14) is formed on the inner periphery of the outer tube (10), and the first thread section (14) is configured to be engaged with the outer periphery of the spout of the faucet (B), and the hand tool is adapted to drive the driving portion (13) of the outer tube (10) to lock the first thread section (14). Then, since the expanding ring portion (23) of the inner tube (20) and the nut (31) of the hose connector (30) are adapted to respectively block the two ends of the inner peripheral ring (12), the inner tube (20), the hose connector (30), and the hose (40) are not rotated synchronously with the outer tube (10), thereby preventing the winding of the hose (40). The first O-ring (27) is adapted to achieve the sealing effect between the outer tube (10) and the inner tube (20) while the second O-ring (28) is configured to achieve the sealing effect between the inner tube (20) and the hose connector (30). Also, the outer tube (10) only makes small-area contact with the inner tube (20) through the inner peripheral ring (12) so that the connection between the outer tube (10) and inner tube (20) is slidable, which is labor-saving in operation of the hose (40) and prevents the connection between the outer tube (10) and the inner tube (20) from getting stuck that cannot have relative rotation.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A hose adapter comprising an outer tube, an inner tube, a hose connector, and a hose;
    wherein the outer tube has a first through hole axially penetrating through the outer tube, and an inner peripheral ring protrudes from the inner periphery of the first through hole; a driving portion is formed at an end of the outer tube while a first thread section is formed on the other end thereof;
    wherein the inner tube has a second through hole axially penetrating through the inner tube, and an open end of the second through hole is formed into a lock hole having a polygonal cross section; an expanding ring portion protrudes from the outer periphery of the end of the inner tube having the lock hole, and the outer periphery of the inner tube from the expanding ring portion to the other end of the inner tube sequentially has a first peripheral recess, a second peripheral recess, and a first outer thread; a first O-ring and a second O-ring are respectively disposed on the first peripheral recess and the second peripheral recess; the inner tube is inserted into the first through hole of the outer tube, and the expanding ring portion is abutted against the inner peripheral ring, and the first O-ring is coupled between the outer tube and the inner tube while the second O-ring and the first outer thread are adapted to pass through and be exposed out of the outer tube;
    wherein the hose connector having a tube body comprises a nut at an end thereof, and an inner thread and a non-thread section are formed on the inner periphery of the nut respectively positioned away from and adjacent to the open end of the nut; the inner thread of the hose connector is engaged with the first outer thread of the inner tube, and the second O-ring is configured to be abutted between the non-thread section and the second peripheral recess, and the other end of the hose connector has an abutting section; and
    wherein the hose is connected to the abutting section of the hose connector at an end thereof, and the outer periphery of the end of the hose has a metal sleeve to secure the connection between the hose connector and the hose, so that the hose, the hose connector, and the inner tube are synchronously rotatable relative to the outer tube.

2. The hose adapter of claim 1, wherein the first thread section is formed on the outer periphery of the outer tube, and the first thread section is adapted to be engaged into the connecting portion of a water spray gun or a sprinkler.

3. The hose adapter of claim 1, wherein the first thread section is formed on the inner periphery of the outer tube, and the first thread section is configured to be engaged with the outer periphery of the spout of a faucet.

4. The hose adapter of claim 1, wherein the non-thread section has an inclined guiding periphery formed on an inner edge of the open end of the nut to enable the non-thread section to slide through the second O-ring.

5. The hose adapter of claim 1, wherein the lock hole is formed with pentagonal, octagram, or plum-blossom cross section.

6. The hose adapter of claim 1, wherein a plurality of tapered threads are formed on the abutting section, and the hose is adapted to be abutted between the tapered threads and the metal sleeve.

* * * * *